April 10, 1928.
G. WALTHER
1,665,485
METAL WHEEL
Filed April 14, 1924
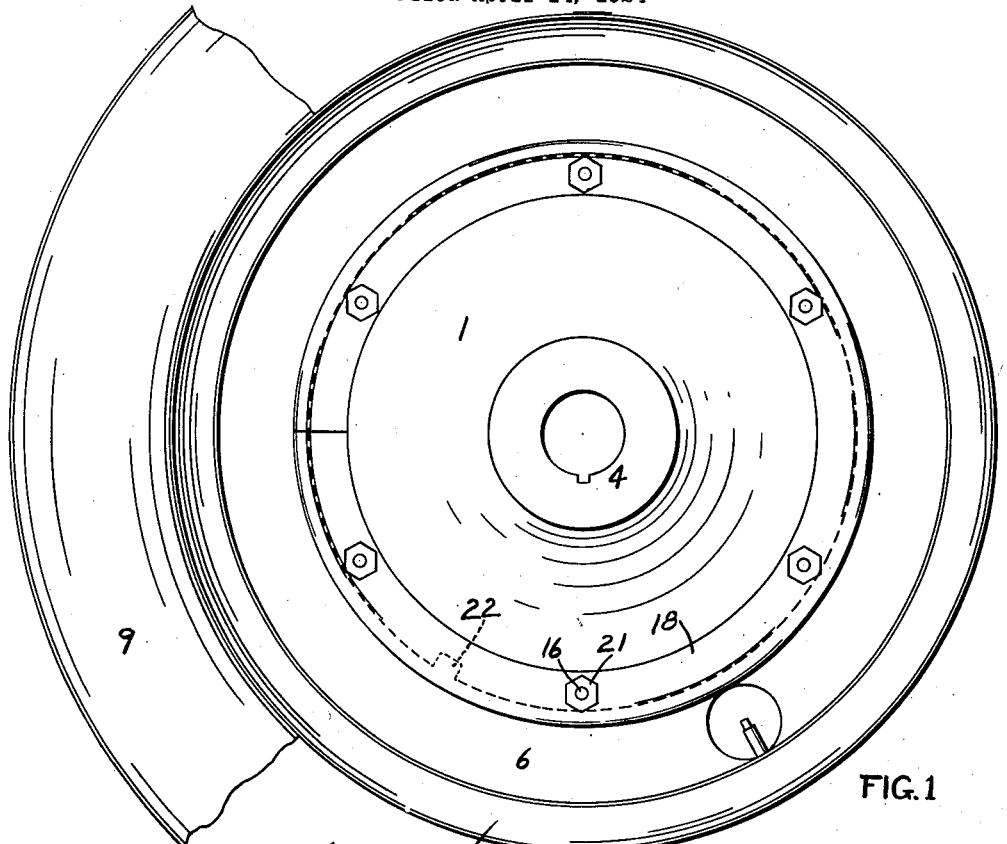
FIG. 1
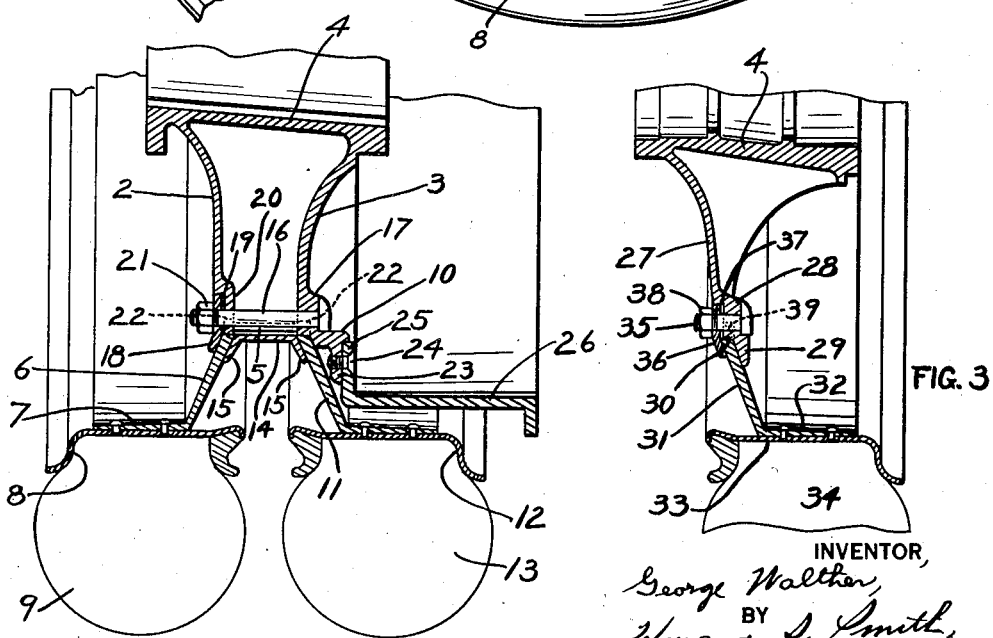
FIG. 2
FIG. 3
INVENTOR,
George Walther,
BY Howard J. Smith,
ATTORNEY Patented Apr. 10, 1928.

1,665,485

UNITED STATES PATENT OFFICE.

GEORGE WALTHER, OF MONTGOMERY COUNTY, NEAR DAYTON, OHIO, ASSIGNOR TO THE DAYTON STEEL FOUNDRY COMPANY, OF DAYTON, OHIO, A CORPORATION OF OHIO.

METAL WHEEL.

Application filed April 14, 1924. Serial No. 706,237.

This invention relates to new and useful improvements in metal wheels, and more particularly to a wheel having an extended hub portion to which one or more rolled and formed rim flanges may be demountably secured.

It is one of the principal objects of my invention to provide a metal wheel, to the extended hub portion of which two rolled and formed rim flanges may be demountably secured for dual tire service, or to which a single rim flange may be demountably secured for single tire use. This not only lessens the cost of manufacture, since the rolled rim flanges may be economically made from strips not carrying offals or waste, but it enables the tires or tire to be demounted near the outside rim, rather than at the hub, so that it is not necessary to carry so much metal when the tires are taken off.

It is another object of my invention to demountably connect the rolled rim flanges or flange to the extended hub portion of the wheel to provide a certain yield or springiness at the point of connection to prevent crystallization of the metal when the wheel is subjected to road shocks.

Still another object of my invention is to provide a metal wheel having an extended hub portion that permits a ready interchangeability of rims, from inside to outside and vice versa, and from front to rear and rear to front.

It is another object of my invention to provide a metal wheel for dual or single tire service, which is attractive and symmetrical, which has a small number of parts and which offers an easy accessibility to its parts and the tires.

Still another object of my invention is to provide a wheel whose extended hub portion is of sufficient width to provide rigidity for driving.

Other important objects will be brought out in the following specification and particularly set forth in the subjoined claims.

In the accompanying drawings, Figure 1 is a side elevational view of my metal wheel constructed for dual-tire use. Figure 2 is a sectional view taken radially through said wheel. Figure 3 is a sectional view taken radially through said wheel when constructed to receive a single tire.

Referring to the accompanying drawings for a detailed description of the various forms of embodiment of my invention illustrated therein, the numeral 1 designates a metal wheel having an extended hub portion such as that provided by the webs 2 and 3 that are cast integral with its hub part 4. These webs extended outwardly a substantial distance from the hub portion 4 of the wheel, to bring the point of demountability of the tires a sufficient distance away from the hub to obviate the necessity of carrying a large mass of metal when the tires are taken off. Near their outer edges the webs 2 and 3 are properly spaced apart by spacer bars 5.

Seated against the outer edge of the web 2 is a rim flange 6 which is rolled and formed from a suitable strip of metal, preferably steel, which may incline outwardly to a lateral tire receiving part 7. The rolled rim flange 6 may also diminish in thickness from its inner edge where it seats against the web 2. The widest part of the taper of the rolled rim flange is at its inner edge so that it will have a firm bearing against the web. Riveted or otherwise secured to the lateral part 7 of the rolled rim flange 6, is a tire-rim 8 carrying a tire 9 which, in this instance, is of the pneumatic type.

The web 3 is formed at its outer edge with an offset portion 10 that is beveled at the side to form with its flat inner part, a seat such as the double one in this instance, for an inwardly inclined and tapered rolled rim flange 11. The latter is preferably similar to the rolled rim flange 6 and has riveted or otherwise secured to it, a tire-rim 12 carrying a tire 13 which, in this instance, is of the pneumatic type.

For the purpose of keeping the rolled rim flanges 6 and 11 a proper distance apart, there is fitted between their inner parts a continuous spacer ring 14 having outwardly flanged sides 15 which seat snugly against the beveled surfaces of the flanges. (See Fig. 2.)

Formed in the webs 2 and 3 near their outer edges, and spaced at uniform distances apart around them, are pairs of alined bolt holes which receive bolts 16, one of which is shown in Figure 2. The heads of these bolts engage shoulders 17 formed on the webs 3, and on their outer ends a split ring 18 is loosely fitted to enter a shoulder notch 19 formed in an offset portion 20 of the web 2. The base of this notch is beveled to permit the inner edge of the split ring 18, which is also beveled, to be pressed tightly against it by nuts 21 on the outer ends of the bolts.

The outer part of the split ring 18 is beveled outwardly to firmly engage the outwardly inclined face of the rolled rim flange 6 when the nuts 21 are screwed inwardly on the bolts 16. When this is done, the rolled rim flange 6 will be pressed firmly against the beveled flange portion 15 of the ring 14, which will form a seat for it in addition to that provided by the outer perimeter of the web 2. Through the continuous ring 14, the roller rim flange 11 will also be pressed against the double seat provided for it by the offset portion 10 on the web 3, when the split ring 18 is forced inwardly by the nuts.

Formed on the inner edge of each one of the rolled rim flanges 6 and 11, is a driving lug 22 which enters a recess formed in its respective web. The construction just described enables these driving lugs the better to drive the tires 9 and 13 than when the discs are connected at the hub of the wheel. Furthermore, when the rolled rim flanges are bolted to the webs as above described, there is a certain yield or springiness at their point of connection, which saves the metal from crystallization when the wheel is subjected to road shocks. This construction also enables the tires to be easily changed from inside to outside and vice versa, or from front to rear and rear to front.

The offset portion 10 of the web 3 has a radial flange 23 to which there is secured by screw rivets or other suitable fastening means, the inner flanged portion 25 of a brake drum 26.

In Figure 3 I have shown my metal wheel constructed to accommodate a single tire. In this wheel the hub portion 4 has cast integral with it an extended portion such as the web 27 which is formed at its outer part with a thick offset portion 28. This offset portion terminates in a radial flange portion 29 whose outer side is beveled to provide, with the peripheral edge 30 of the web, a double seat for an inwardly inclined and tapering rim flange 31 which is rolled and formed from a suitable strip of metal, preferably steel. This flange terminates at its outer end in a lateral tire-rim receiving portion 32 to which there is riveted or otherwise suitably secured, a tire rim 33 carrying a tire 34 which in this instance is of the pneumatic type.

Formed in the offset portion 28 of the web 27, and spaced at uniform distances apart around it, are bolt holes which receive bolts 35, one of which is shown in Figure 3. The heads of these bolts are substantially semicircular to fit in recesses in the inner portion of the offset part of the web, and on the outer ends of these bolts a split ring 36 is loosely fitted to enter a shoulder notch 37 formed in the offset portion 28 of the web. The base of this notch is beveled to permit the inner edge of the split ring 36, which is also beveled, to be pressed tightly against it by nuts 38 on the outer ends of the bolts.

The outer part of the split ring 36 is inclined inwardly to engage the inner part of the rolled rim flange 31 when the nuts 38 are screwed inwardly on the bolts 35, to press said rim flange firmly against the beveled seat 29 which the offset portion 28 of the web 27 provides for it. The inner edge of the rolled rim flange 31, which is the widest part of its taper, will also seat firmly against the web along its outer peripheral edge 30. This bolt connection between the web and the rolled rim flange insures a certain yield or springiness at points which are somewhat distant from the hub, to save the metal from crystallization when the wheel is subjected to road shocks.

Formed on the inner edge of the rolled rim flange 31 is a driving lug 39 which enters a recess formed in the outer peripheral edge of the web 27, for the purpose of driving the rim flange and the tire 34.

Having described my invention, I claim:

1. A metal wheel having an extended hub portion, a pair of rim flanges, means for securing said rim flanges to said extended hub portion, and a spacer between the rim flanges beyond the securing means.

2. A metal wheel having an extended hub portion, a pair of rim flanges, means for securing said rim flanges to said extended hub portion, and a spacer ring between said rim flanges.

3. A metal wheel having a hub portion from which two webs radially project, a rim flange mounted against the outer peripheral edge of each web, spacing means between the rim flanges, and clamping means for demountably securing the rim flanges to the webs.

4. A metal wheel having a hub portion from which two integral webs radially project, a rolled rim flange mounted against the outer peripheral edge of each web, a tire rim on each rolled rim flange, a shoulder on the outer part of the inner web, a spacer ring between the rolled rim flanges, and clamping means for demountably securing the rolled rim flanges to the webs.

5. A metal wheel having a hub portion from which two integral webs radially project, a rolled rim flange mounted against the outer peripheral edge of each web, a beveled shoulder on the outer part of the inner web, a spacer ring between the rolled rim flanges and having inclined flanges adapted to press against the rolled rim flanges, and clamping means adapted to press against the outer rolled rim flange, and through the spacer ring, against the inner rolled rim flange to force it firmly against the beveled shoulder on the inner web.

6. A metal wheel having a hub portion from which two integral webs radially project, a rolled rim flange mounted against the outer peripheral edge of each web, a tire rim on each rolled rim flange, a beveled shoulder on the outer part of the inner web, a spacer ring between the rolled rim flanges and having inclined flanges adapted to press against them, said webs having pairs of alined bolt holes spaced a uniform distance apart around them, bolts projecting through said holes, a clamping ring freely mounted on the outer ends of said bolts, and nuts on the latter adapted to press the clamping ring against the outer rolled rim flange, and through the spacer ring, against the inner rolled rim flange to force it tightly against the beveled shoulder on the web.

7. A metal wheel having a hub portion from which two webs radially project, a pair of rim flanges secured to the webs, and a driving lug formed on each rim flange adapted to engage its respective web.

8. A metal wheel having a hub portion from which two integral webs radially project, a pair of rolled rim flanges demountably secured to the latter, each web being formed with a recess in its outer peripheral edge, and a driving lug on each rolled rim flange to enter the recess in its respective web.

9. A metal wheel having a hub portion from which a radial web projects, said web terminating at its outer part with an offset angle portion, and a brake drum secured to said offset portion.

10. A metal wheel having an extended hub portion, a pair of tire supports, means for securing said tire supports to said extended hub portion, and a spacer between said tire supports beyond the securing means.

11. A metal wheel having an extended hub portion, a pair of tire supports, means for securing said tire supports to said extended hub portion, and a continuous floating ring spacer between said tire supports.

12. A metal wheel having an extended hub portion, two tire supports, means for securing said tire supports at their inner edges to said extended hub portion, and a separate, flanged spacing ring between said supports beyond the securing means.

13. A metal wheel having an extended hub portion, spaced seats on the outer periphery of the latter, the inner seat being tapered on its side facing the outer seat, a pair of tire supports, means for securing said tire supports at their inner edges upon said seats, and a spacer between said supports beyond the securing means.

14. A metal wheel having an extended hub portion, spaced seats on the outer periphery of the latter, the inner seat being beveled, a pair of tire supports, the inner support being beveled on its outer side to engage the beveled inner seat, and a spacer between said supports beyond the securing means.

In witness whereof I have hereunto set my hand this 12th day of April, 1924.

GEORGE WALTHER.

DISCLAIMER.

1,665,485.—*George Walther*, Montgomery County, near Dayton, Ohio. METAL WHEEL. Patent dated April 10, 1928. Disclaimer filed August 2, 1929, by the assignee, *The Dayton Steel Foundry Company*, inventor, said *Walther*, concurring.

Hereby enters this disclaimer limiting said claims of said patent as follows:

In claim 1, by restricting the element "an extended hub portion" to include "integral radially projecting spaced portions terminating in supporting spaced flanges."

In claim 2, by restricting the element "an extended hub portion" to include "integral radially projecting spaced portions terminating in supporting spaced flanges."

In claim 10, by restricting the element "an extended hub portion" to include "integral radially projecting spaced portions terminating in supporting spaced flanges."

In claim 11, by restricting the element "an extended hub portion" to include "integral radially projecting spaced portions terminating in supporting spaced flanges."

In claim 13, by restricting the element "an extended hub portion" to include "integral radially projecting spaced portions terminating in supporting spaced flanges."

In claim 13, by restricting the elements "means for securing said tire supports at their inner edges upon said seats" to include "means for securing said tire supports only on their inner edges upon said seats."

In claim 14, by restricting the element "an extended hub portion" to include "integral radially projecting spaced portions terminating in supporting spaced flanges."

[*Official Gazette August 20, 1929.*]